United States Patent [19] [11] Patent Number: 5,332,641
Finn et al. [45] Date of Patent: Jul. 26, 1994

[54] FUSER MEMBER WITH AN AMINO SILANE ADHESIVE LAYER

[75] Inventors: Patrick J. Finn, Webster; George J. Heeks, Rochester; Arnold W. Henry, Pittsford; Alan R. Kuntz, Webster, all of N.Y.

[73] Assignee: Xerox Corporation, Stamford, Conn.

[21] Appl. No.: 874,165

[22] Filed: Apr. 27, 1992

[51] Int. Cl.$^5$ ............ G03G 13/20; G03G 9/00; B32B 15/04
[52] U.S. Cl. ............ 430/124; 428/444; 428/447; 428/448; 428/450; 430/99; 430/104
[58] Field of Search ............ 430/99, 104, 124; 428/447, 448, 450, 444

[56] References Cited

U.S. PATENT DOCUMENTS 5,017,432 5/1991 Eddy et al. ............ 428/422
5,049,444 9/1991 Bingham et al. ............ 428/339

*Primary Examiner*—John Kight, III
*Assistant Examiner*—T. Mosley

[57] ABSTRACT

A fuser member for fusing thermoplastic resin toner images to a substrate has an aluminum base member and an elastomer fusing surface of a poly(vinylidenefluoride-hexafluoropropylene-tetrafluoroethylene) where the vinylidenefluoride is present in an amount less than 40 mole percent, the elastomer having been cured from a solvent solution thereof with a nucleophilic curing agent soluble in the solution and in the presence of 5 or less than 4 parts by weight of inorganic base per 100 parts of polymer, the inorganic base being effective to at least partially dehydrofluorinate the vinylidenefluoride, and an adhesive layer between the surface of said aluminum base member and the elastomer fusing surface, the adhesive layer having been cured from a solvent solution of a poly(vinylidenefluoride-hexafluoropropylene-tetrafluoroethylene) where the vinylidenefluoride is present in an amount less than 40 mole percent and from about 6 to 20 parts by weight per 100 parts by weight of said poly(vinylidenefluoride hexafluoropropylene-tetrafluoroethylene) of an amino silane represented by the formula:

$$[R'-(O)_q]_h Si-Y \atop | \atop (R)_b$$

where R can be an alkyl group having 1 to 7 carbon atoms; R' can be an alkyl group having 1 to 7 carbon atoms or a polyalkoxyalkyl group of less than 7 carbon atoms; Y is an amino group or an amino substituted alkyl, or a polyamino substituted alkyl, or an alkenylalkoxy amino, or an aryl amino group of less than 15 carbon atoms, h is 1 to 3, b is 0 to 2, q is 1 or 2 and h+b=3.

20 Claims, 1 Drawing Sheet

FUSER MEMBER WITH AN AMINO SILANE ADHESIVE LAYER

CROSS REFERENCE TO RELATED APPLICATION

Attention is directed to U.S. application Ser. No. 07/755,274 (D/91367) filed Sep. 5, 1991, in the name of Henry et al., and entitled "Multilayered Fuser Member".

The present invention relates to a fuser member and method for fusing toner images in electrostatographic reproducing apparatus. In particular, it relates to a long-life fuser member for use with a polymeric release agent having functional groups which has an amino silane adhesive layer.

BACKGROUND OF THE INVENTION

In U.S. Pat. No. 5,017,432 to Eddy et al., commonly assigned to the assignee of the present application, a fuser member and fuser system are described wherein a polymeric release agent having functional groups is supplied to the surface of a fuser member which comprises a poly(vinylidenefluoride-hexafluoropropylene-tetrafluoroethylene) wherein the vinylidenefluoride is present in an amount less than 40 mole percent, a metal oxide is present in amount sufficient to interact with the polymeric release agent having functional groups to provide an interfacial barrier layer between fusing surface and the toner is substantially unreactive with the elastomer and wherein the elastomer is cured from a solvent solution thereof with a nucleophilic curing agent soluble in the solution and in the presence of less than 4 parts by weight of inorganic base per 100 parts by weight of polymer with the inorganic base being effective to at least partially dehydrofluorinate the vinylidenefluoride. U.S. Pat. No. 5,017,432 together with those patents described in the prior art section of that patent disclosure are hereby specifically and totally incorporated by reference into the instant specification. In the practice of the fuser member described in U.S. Pat. No. 5,017,432, at least one elastomeric layer is positioned between the base member and the outer layer and is typically also a poly(vinylidenefluoride-hexafluoropropylene-tetrafluoroethylene) wherein the vinylidenefluoride is present in an amount less than 40 mole percent, which is adhesively bound to an aluminum coated copper base in some instances and to an all aluminum base in other cases by an epoxy adhesive such as Thixon 300/301. Thixon is a trademark of Dayton Chemical Products Laboratories. While such a fuser member provides a relatively long life on the average having a copy count of 1.9 to 2.1 million copies for all failure modes in the Xerox 5090 printing machine, it does suffer a particular failure of the fluoroelastomer fusing surface debonding from the aluminum substrate. It has been determined that the bond between the aluminum surface and the fluoroelastomer fusing layer degrades as a function of time at the elevated temperatures involved in the fusing process which may exceed 400° F. The Thixon epoxy adhesive degrades to the point where it no longer functions as an adhesive and failure is experienced with wholesale debonding of the fusing layer from the aluminum substrate in that the fusing surface may be manually peeled from the aluminum substrate.

In U.S. Pat. No. 5,049,444 to Bingham et al., entitled "Silane Adhesive System For Fusing Member" and commonly assigned to the assignee of the present application, an adhesive layer includes a copolymer of vinylidenefluoride and hexafluoropropylene and at least 20 percent by weight of a coupling agent which comprises at least one organofunctional silane and an activator. In a specific embodiment, the organofunctional silane is a mixture of about 4 parts by weight of ethenyl triethoxy silane to one part by weight of 3-(triethoxy silyl)-1-propanamine such as that available from Minnesota Mining and Manufacturing Company under the designation Dynamar 5150. This is a 6 percent mixture of the active ingredients and benzyl triphenyl phosphonium chloride curing activator in 94 percent methanol with a small amount of water. While this organofunctional silane coupling agent, when mixed with a copolymer of vinylidenefluoride and hexafluoropropylene having a relatively low molecular weight, provides a good adhesive between the base support member and the tie coat layer or elastomeric fusing surface, it is inadequate when used with the higher molecular weight fluoroelastomers such as Viton GF, a polymer of 35 mole percent vinylidenefluoride, 34 mole percent hexafluoropropylene and 29 mole percent tetrafluoroethylene. This is believed to be due to the fact that the organofunctional silane coupling agent and high molecular weight fluoroelastomer do not evenly coat the aluminum substrate, but rather provide a discontinuous (less than 50 percent of the surface is covered) layer on the aluminum substrate. This is believed to be due to the highly polar nature of the water and the alcohol which cause the relatively high molecular weight Viton GF to come out of solution, even forming clumps of the fluoropolymer and not uniformly coating the substrate.

SUMMARY OF THE INVENTION

In accordance with a principle aspect of the present invention a unique adhesive layer is provided between an aluminum base member and an elastomer fusing surface comprising poly(vinylidenefluoride-hexafluoropropylene-tetrafluoroethylene) wherein the vinylidenefluoride is present in an amount less than 40 mole percent.

In a further aspect of the present invention the adhesive layer is applied from a solvent solution of a poly(vinylidenefluoride-hexafluoropropylene-tetrafluoroethylene) where the vinylidenefluoride is present in an amount less than 40 mole percent and from about 6 to 20 parts by weight per 100 parts by weight of the poly(vinylidenefluoride-hexafluoropropylene-tetrafluoroethylene) of an amino silane represented by the formula:

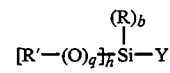

where R can be an alkyl group having 1 to 7 carbon atoms; R' can be an alkyl group having 1 to 7 carbon atoms or a polyalkoxyalkyl group of less than 7 carbon atoms; Y is an amino group or an amino substituted alkyl, or a polyamino substituted alkyl, or an alkenylalkoxy amino, or an aryl amino group of less than 15 carbon atoms, h is 1 to 3, b is 0 to 2, q is 1 or 2 and h+b=3.

In a further aspect of the present invention a metal oxide may be present in the elastomer fusing surface in an amount sufficient to interact with a polymeric release agent having functional groups to provide an interfacial barrier layer between the fusing surface and toner and being substantially unreactive with the elastomer.

In a further aspect of the present invention, the fuser member includes at least one base coat elastomer layer between the adhesive layer and the elastomer fusing surface, which may be poly(vinylidenefluoride-hexafluoropropylene-tetrafluoroethylene) where the vinylidenefluoride is present in an amount less than 40 mole percent.

In a further aspect of the present invention the adhesive layer is about 0.4 to 1.0 mil in thickness, the base coat elastomer is from about 4.5 to 6.5 mil in thickness and the release layer is from about 1.5 to about 2.5 mil in thickness.

In a further aspect of the present invention, the amino silane is gamma-aminopropyltriethoxy silane.

In a further aspect of the present invention, the elastomer fusing surface is applied from a solvent solution thereof with a nucleophilic curing agent soluble in the solution and in the presence of up to 9 parts by weight of inorganic base per hundred parts of polymer, the inorganic base being effective to at least partially dehydrofluorinate the vinylidenefluoride.

In accordance with a further aspect of the present invention, the nucleophilic curing agent comprises a fluorinated bisphenol crosslinking agent and an organophosphonium salt accelerator.

In a further aspect of the present invention the metal oxide is cupric oxide which is present in an amount of from about 5 to 30 parts by weight per hundred parts by weight of polymer and has a mean particle diameter of from about 4 to 8 microns.

DETAILED DESCRIPTION OF THE PRESENT INVENTION

Figure 1:
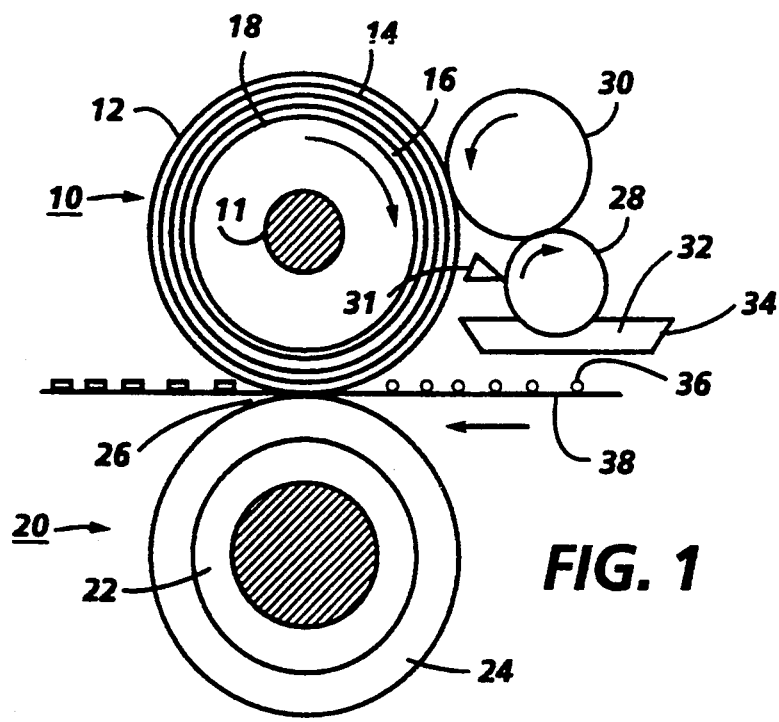
FIG. 1 is a sectional view of a fuser system which may use the fuser member of the present invention.

A typical fuser member of the present invention is described in conjunction with the fuser assembly as illustrated in FIG. 1 wherein the numeral 10 designates a multilayered fuser roll comprising in sequential order a base support member 18, an adhesive layer 16, a base coat layer 14 and elastomeric fusing surface 12 having metal oxide filler dispersed therein (not shown). The base support member 18 which is typically a hollow cylinder or core, has suitable heating element 11 disposed in the hollow portion thereof which is co-extensive with the cylinder. Backup or pressure roll 20 cooperates with the fuser roll 10 to form a fusing nip or contact arc 26 through which a copy paper or other substrate 38 passes, such that toner images 36 thereon contact the elastomer fusing surface 12 of the fuser roll 10. As shown in FIG. 1, the backup roll 20 has a rigid steel core 22 with an elastomeric surface or layer 24 thereon. Sump 34 contains polymeric release agent 32 having functional groups thereon which may be solid at room temperature but is fluid at operating temperatures. The release agent is one having functional groups to provide an interfacial barrier layer between the fusing surface and the toner. In the embodiment shown in FIG. 1, two release agent delivery rolls 28 and 30 are provided for applying polymeric release agent 32 to the elastomer surface 12 from the sump 34. These two release agent delivery rolls are rotatably mounted in the direction indicated to transport the release agent from the sump to the elastomeric fusing surface. As illustrated in FIG. 1, roll 28 is partly immersed in the sump 34 and transports on its surface release agent from the sump to the delivery roll 30. By using a metering blade 31, a layer of polymeric release fluid can be applied initially to delivery roll 30 and subsequently to the elastomeric fusing surface in a controlled thickness ranging from sub micron thickness to a thickness of the order of several microns of release fluid. Accordingly, by metering device 31 a layer of release fluid about 0.1 to 2 microns or greater thicknesses can be applied to the surface of elastomer fusing surface.

Figure 2:
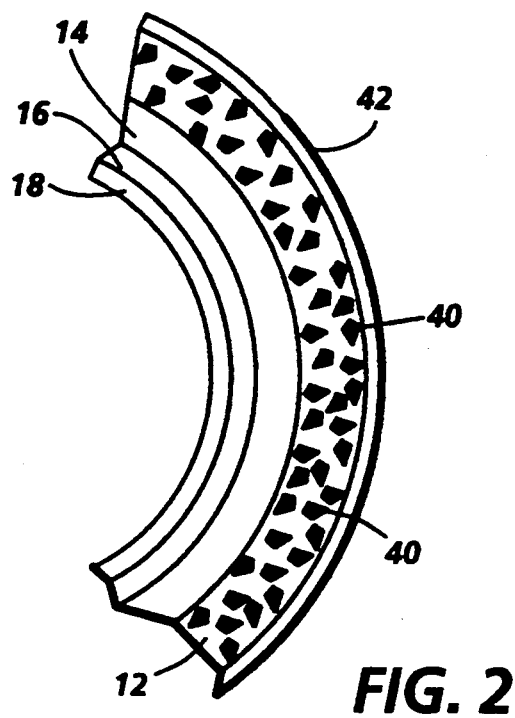
FIG. 2 is an enlarged fragmentary sectional view of one embodiment of the fuser member of the present invention.

Referring now to FIG. 2 there is shown a fragmentary view of the fuser member according to the present invention magnified many times in order to show it's multilayered structure. In FIG. 2 the metal oxide filler particles 40 are shown as having irregular shapes, however, any form of metal oxide may be used in the elastomeric fusing surface 12, powders, platelets, sphroids, fibers, oval particles and the like. In addition, the film of polymeric release agent having functional groups is illustrated on the surface of elastomer fusing surface 12 and is designated by the reference numeral 42. FIG. 2 illustrates the embodiment represented in FIG. 1 wherein the adhesive layer is bound directly to a suitable base support member and a base coat layer. The surface of the base support member is aluminum which may be an aluminum tube, an anodized aluminum surface or alternatively a flame sprayed or otherwise aluminum coated steel, copper or other metal tube.

According to the present invention, the adhesive layer bonds the aluminum base support member to a fusing or release layer and in a preferred embodiment, bonds it to an intermediate base coat layer, which in turn is bonded to the fusing or release layer. All of the adhesive layer, base coat layer and fusing or release layer are based on the polymer poly(vinylidenefluoride-hexafluoropropylene-tetrafluoroethylene) where the vinylidenefluoride is present in an amount less than 40 mole percent to insure compatibility and maximum bonding effectiveness between adjacent layers.

The amino silane, useful in the adhesive layer of the present invention, is represented by the formula

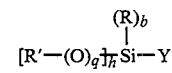

where R can be an alkyl group having 1 to 7 carbon atoms, R' can be an alkyl group having 1 to 7 carbon atoms or a polyalkoxyalkyl group of less than 7 carbon atoms; Y is an amino group or an amino substituted alkyl, or a polyamino substituted alkyl or an alkenylalkoxy amino or an aryl amino group of less than 15 carbon atoms and h is 1 to 3, b is 0 to 2, q is 1 or 2 and h+b=3.

Particularly effective materials include gamma amino propyltriethoxy silane available from Union Carbide under the product name Union Carbide Organo functional Silane A-1100 and other suitable materials include N-(2 aminoethyl-3-aminopropyl) trimethoxysilane, 6-(aminohexylaminopropyl) trimethoxysilane, p-aminophenyltrimethoxysilane, 3-(1 aminopropoxy)-3, 3-dimethyl-1-propenyltrimethoxysilane, 3-aminopropyltris(methoxyethoxyethoxy) silane and N-(2-aminoethyl)-3-aminopropylmethyldimethoxy silane.

The fluoroelastomer used as the fusing surface layer is that described in the above-referenced Eddy et al., U.S. Pat. No. 5,017,432, which describes a fusing surface layer made from a poly(vinylidenefluoride-hexafluoropropylene-tetrafluoroethylene) where the vinylidenefluoride is present in an amount less than 40 mole percent. Commercially available fluoroelastomers having low quantities of vinylidenefluoride include Viton GF available from E.I. Du Pont de Nemours, Inc. which has about 35 mole percent vinylidenefluoride, 34 mole percent hexafluoropropylene and 29 mole percent tetrafluoroethylene with 2 percent cure site monomer. While Viton GF is generally cured with conventional aliphatic peroxide curing agent, according to the present invention, it is cured by a nucleophilic curing system in the presence of relatively low amounts of inorganic base materials. Typically, up to nine parts by weight of inorganic base per hundred parts of polymer, and preferably about three parts of inorganic base per hundred parts by weight of polymer are present to at least partially dehydrofluorinate the vinylidenefluoride. As further described in the Eddy et al. patent, the poly(vinylidenefluoride-hexafluoropropylene-tetrafluoroethylene) is cured with Viton Curative No. 50 available from E.I. Du Pont de Nemours, Inc. which is soluble in a solvent solution of the polymer at low base levels and is readily available at the reactive sites for crosslinking. Curative No. 50 incorporates an accelerator, a quarternary phosphonium salt or salts and a crosslinking agent, bisphenol AF, into a single curative system.

In a preferred embodiment a metal oxide is disbursed in the fluoroelastomer which is capable of interacting with the functional groups of the polymeric release agent to form a thermally stable film which releases the thermoplastic resin toner and prevents the toner from contacting the elastomer material itself. In addition, it is important that the metal oxide be substantially unreactive with the elastomer so that no substantial dehydrofluorination of the vinylidenefluoride in the polymer may take place. The preferred metal oxide is cupric oxide, which has been found to be a weak base and softens rather than hardens the elastomer with time thereby maintaining good copy quality and is typically present in an amount of from about 5 to 30 parts by weight per hundred parts of the polymer although it is preferred to have from about 10 to 20 parts by weight of metal oxide. In addition, the particle size of the metal oxide is important and it should not be so small as to interfere with the curing of the polymer nor so large as to supply an insufficient number of particles disbursed throughout the elastomer surface for good release properties. Typically, the metal oxide particles have a mean diameter of from about four to eight microns, preferably six microns.

Other adjuvents and fillers may be incorporated in the elastomer in accordance with the present invention as long as they do not effect the integrity of the elastomer, the interaction between the metal oxide and the polymeric release agent having functional groups or prevent the appropriate crosslinking of the elastomer. Such fillers normally encountered in the compounding of elastomers include coloring agents, reinforcing fillers, crosslinking agents, processing aids, accelerators and polymerization initiators.

The surface of the fuser member of the present invention is preferably a roll, preferably one prepared by applying either in one application or successively applying to the surface to be coated thereon, a thin coating or coatings of the elastomer with metal oxide filler dispersed therein. Coating is most conveniently carried out by spraying, dipping, or the like, a solution or homogeneous suspension of the elastomer containing the filler. While molding and extruding techniques are alternative means which may be used, we prefer to spray successive applications of a solvent solution of the polymer and metal oxide filler to the surface to be coated. Typical solvents that may be used for this purpose include acetone, methyl ethyl ketone, methyl isobutyl ketone and the like. When successive applications are made to the surface to be coated it is generally necessary to permit the film coated surface to stand at room temperature to flash off any solvent contained in the film. For example, when a fuser roll is coated with an elastomer layer containing metal oxide, the elastomer having metal oxide dispersed therein is successively applied to the roll in thin coatings and between each application evaporation of the solvent in the film coated on the roll is carried out at ambient temperatures to about 90° C. or higher so as to flash off most of the solvent contained in the film. When the desired thickness of coating is obtained, the coating is cured and thereby bonded to the roll surface.

Typically, the amino silane is present in a solvent solution of poly(vinylidenefluoride-hexafluoropropylene-tetrafluoroethylene) where the vinylidenefluoride is present in an amount of less than 40 mole percent in an amount of from about 2 to 20 parts by weight per hundred parts by weight of the poly(vinylidenefluoride-hexafluoropropylene-tetrafluoroethylene). As previously stated, the solvents used in forming the adhesive solution are typically relatively low polar solvents such as: acetone, methylethylketone, methyl isobutyl ketone and the like. Typically, the solution from which the adhesive layer is formed is sprayed on to a thickness from about 0.4 to 1 mil and allowed to dry at room temperature for at least half an hour followed by the subsequent application of the base coat and/or the fusing release layer.

The base coat is typically based on the poly(vinylidenefluoride-hexafluoropropylene-tetrafluoroethylene) with relatively high levels of carbon black to provide a relatively inexpensive, yet sufficiently thick fluoroelastomer surface to provide sufficient conformability around toner particles and paper fibers to enable low and uniform gloss to fused toner images which yield better copy quality. Typically, the base coat is sprayed on the fuser member, coated with the adhesive layer to a thickness of from about 4.5 to about 6.5 mils thickness followed by a warm air step cure of 2 hours at 100° F., 3 hours at 170° F., 2 hours at 350° F., 1 hour at 400° F. followed by cooling and sanding. Subsequently, the solvent solution of the poly(vinylidenefluoride-hexafluoropropylene-tetrafluoroethylene) together with metal oxide anchoring sites, nucleophilic curing agent, and inorganic base are sprayed on the roll to form a release layer of from about 1.5 to about 2.5 mils thickness, followed by curing by step wise heating at 95° C. for 2 hours, followed by 150° C. for 2 hours, 175° C. for 2 hours, 205° C. for 2 hours and 230° C. for 16 hours, followed by cooling and sanding.

Any suitable polymeric release material having functional groups may be employed. Typical polymeric release agents are described in U.S. Pat. No. 4,101,686 which describe polyorganosiloxane fluids as release agents. The polyorganosiloxane fluids and other polymer fluids having functional groups interact with the metal oxide particles in the fuser member in such a manner as to form an interfacial barrier at the surface of the fuser member while leaving an unreacted low surface energy release fluid as an outer layer film. Other exemplary polymeric release agents having functional groups are described in U.S. Pat. Nos. 4,046,795, 4,029,827 and 4,011,362. The polymeric release agent having functional groups thereon may be found as a liquid or solid at room temperature but it is a fluid at operating temperatures. In preferred embodiments, the chemically reactive groups of polymeric release material are mercapto, carboxy, hydroxy, isocyanate, epoxy, and amino. The most preferred polymeric release agents having functional groups thereon used in accordance with the present invention are the mercapto functional polyorganosiloxanes described in U.S. Pat. Nos. 4,101,686 and 4,029,827.

The following Examples further define and describe fuser rolls prepared by the present invention and illustrate preferred embodiment of the present invention. Unless otherwise indicated, all parts and percentages are by weight.

EXAMPLE I

Fuser rolls were prepared using cylindrical aluminum cores 3 inches in diameter and 17 inches long. The core was degreased, grit blasted, degreased and covered with an epoxy adhesive, Thixon 300/301. Thixon is a trademark of Dayton Chemical Products Laboratories. A base coat layer was formed by spraying onto the core a solvent solution/dispersion of 100 parts by weight of Viton GF, 30 parts by weight of carbon black, (Thermax N 880 available from R. T. Vanderbilt Co., Norwalk, Conn.) 15 parts by weight magnesium oxide (Maglite Y available from C. P. Hall) and 5 parts by weight of Du Pont Curative 50 in 50/50 by weight methyl ethyl ketone and methyl isobutyl ketone. The elastomer coated core was warm air step cured at 38° C. for 2 hours, 77° C. for 4 hours followed by 2 hours at 177° C. after which the surface was sanded to provide a nominal thickness of about 5 mils. The fusing layer was prepared from a solvent solution/dispersion containing 100 parts by weight Viton GF, a polymer of 35 mole percent vinylidene fluoride, 34 mole percent hexafluoropropylene and 29 mole percent tetrafluoroethylene and 2 mole percent of a copolymerized cure site monomer, 2 parts by weight magnesium oxide (Maglite D available from C. P. Hall, Chicago, Ill.) and 1 part calcium hydroxide per 100 parts polymer and 15 parts by weight cupric oxide, 5 parts Curative No. 50, in a mixture of methyl ethyl ketone and methyl isobutyl ketone and was sprayed upon the multi-coated aluminum roll to a thickness of 3 to 5 mils. The fluoroelastomer was cured by step wise heating at 95° C. for 2 hours, followed by 150° C. for 2 hours, 175° C. for 2 hours, 205° C. for 2 hours and 230° C. for sixteen hours followed by cooling and sanding to a total nominal rubber thickness of about 8 mils. The fuser roll was used in Xerox 5090 duplicators and tested in a fusing system wherein a mercapto functional polyalkylsiloxane release agent is applied at an average rate of 4 microliters per 8½×11 inch copy. Of 29 rolls tested 15 experienced debonding failure at an average life of 2.06 million copies. The remaining 14 rolls failed for other reasons like release problems, etc., at various copy levels.

EXAMPLE II

The procedure of Example I is repeated except that the Thixon 300/301 epoxy adhesive layer is replaced by a silane adhesive system prepared as follows: 8% solutions in methyl isobutyl ketone were made for each of parts A and B by shaking each for three hours and roll milling overnight.

|  | A | B |
| --- | --- | --- |
| Viton GF | 100 pts. | 100 pts. |
| Carbon Black (Thermax N/990) | 30 pts. | 30 pts. |
| Magnesium oxide (Maglite Y) | 30 pts. | — |
| Curative No. 50 | — | 16 |
| Calcium oxide | 3 pts. | — |
| Total | 163 | 146 |

A solution of 12 parts by weight of amino silane (Union Carbide A 1100), 24 parts methyl isobutyl ketone and 168 parts of 2 propanol was added to part B. Then equal parts of this mix and part A were mixed followed by spraying the adhesive layer and the degreased aluminum substrate to a thickness of 0.5 mil. The base coat layer and fusing layer were subsequently applied as in Example I. These fuser rolls were used in Xerox 5090 duplicators as in Example I. Of 10 rolls tested, 7 experienced debonding failure at an average life of over 2.4 million copies. The other three rolls failed for other reasons.

Additional adhesion evaluations were compared for the Thixon 300/301 adhesive and the amino silane adhesive system according to the present invention by evaluating hot air aged aluminum shims with the respective adhesives bonding the base coat to the aluminum shim. There was no release or fusing layer on top of the base coat. The shims were prepared as follows:

6160 grade aluminum shims 1"×6"×0.060" were degreased with methyl ethyl ketone, grit blasted with Dynablast 80 grit, air blown and degreased with methyl ethyl ketone. The following formulas were mixed in a two roll mill for sufficient time to ensure adequate dispersion.

| 1086A | Parts Per 100 of Rubber (PHR) |
| --- | --- |
| Viton GF | 100 |
| N/990 Carbon Black | 30 |
| Maglite Y | 30 |
| Calcium Oxide | 3 |
| Total | 163 |
| 1085 | PHR |
| Viton GF | 100 |
| N/990 Carbon Black | 30 |
| Curative No 50 | 16 |
| Total | 146 |

8% solutions of 1085 and 1086A were made in methyl isobutyl ketone by shaking to dissolve for three hours and rolling overnight in a roll mill. The amino silane Union Carbide A1100, ketone and 2 propanol were mixed in the following amounts and allowed to stand for 20 hours.

|  | Parts by weight |
| --- | --- |
| A1100 | 12 |
| MIBK | 24 |
| 2-Propanol | 168 |

The A1100/ketone/propanol solution was added to the 1085 solution. Equal parts of the 1086A and the 1085/A1100 solutions were mixed together. The silane adhesive was sprayed on rotating shims to a thickness of 0.8 mils and allowed to stand for a minimum of 0.5 hrs. at room temperature. A base coat, 0.2-0.4 mils thick was sprayed on to the silane adhesive from a 12% by weight solution/dispersion of 100 parts by weight Viton GF, 30 parts by weight carbon black (Thermax N880) 15 parts by weight magnesium oxide (Maglite Y) and 5 parts by weight of Du Pont Curative 50 in methyl isobutyl ketone. The base coat was subjected to ambient desolvation for 24-30 hrs. The base coat was step cured for 2 hrs @100 F., 3 hrs @170 F., 2 hrs. @350 F., 1 hr. @400 F. The twice coated aluminum shims were placed in a six cavity shim mold with the rubber side up. An additional portion of the above described base coat compound without solvent was freshened by remilling in the two roll mill and sheeted off to 60 to 70 mils thickness. This was cut into 6"×6" sheets of rubber and placed on top of the shims in the six cavity shim mold which was then placed in a hydraulic press. The temperature of the rubber molding hydraulic press was set for 270° F. The mold was heated to 260° F.-280° F. and subjected to pressure of 1 min. @5 tons, 1 min @10 tons, 0.5 min. @15 tons, 1.5 min. @30 tons. The above temperature and pressure treatment softens the rubber in the mold while building up to maximum pressure. The shims were demolded and subjected to a 24 hour post cure by step wise heating at 95° C. for 2 hours, followed by 150° C. for 2 hours, 175° C. for 2 hours, 205° C. for 2 hours and 230° C. for sixteen hours.

The shims with the Thixon 300/294 adhesive were prepared by omitting the silane adhesive system and coating the aluminum shim with the epoxy adhesive, Thixon 300/294.

The shims were evaluated by aging at 193° C., 215° C. and 240° C. over a period of time to failure with the shims being periodically cooled to room temperature, subjected to a Finger Peel Test to try to manually lift the fluoroelastomer off the aluminum shim. This was followed by heating the shim on a hot plate until it felt too hot to touch at which time the Finger Peel Test was repeated. The same sample was evaluated until it failed. The days to adhesive failure where no rubber was left on the aluminum are shown in the table below.

|  | 193° C. | 215° C. | 240° C. |
| --- | --- | --- | --- |
| Thixon 300/294 Adhesive |  |  |  |
| Room Temp. Peel Test | 38 days | 25 days | 30 days |
| Hot Temp. Peel Test | 70 days | 67 days | 25 days |
| Silane Adhesive System |  |  |  |
| Room Temp. Peel Test | >400 days | 325 days | 150 days |
| Hot Temp. Peel Test | >400 days | 200 days | 60 days |

Thus, according to the present invention a long life fuser member has been provided by the provision of a unique amino silane adhesive system between an aluminum fuser member substrate and a fusing surface comprising poly(vinylidenefluoride-hexafluoropropylene-tetrafluoroethylene) where the vinylidenefluoride is present in an amount less than 40 mole percent.

All the patents and patent applications referred to herein are hereby specifically and totally incorporated by reference in their entirety in the instant specification.

While the invention has been described in detail with reference to specific and preferred embodiments, it will be appreciated that various modifications and variations will be apparent to the artisan. For example, while the invention has been illustrated with reference to a fuser roll, it will be understood that it has equal application to other fuser members such as curved or flat plate members in pressure contact with the toner image. All such modifications and embodiments as may readily occur to one skilled in the art are intended to be within the scope of the appended claims.

We claim:

1. A fuser member for fusing thermoplastic resin toner images to a substrate in a fuser system of the type wherein a polymeric release agent having functional groups is applied to the surface of the fuser member, the fuser member comprising an aluminum base member and an elastomer fusing surface comprising poly(vinylidenefluoride-hexafluoropropylene-tetrafluoroethylene) where the vinylidenefluoride is present in an amount less than 40 mole percent, said elastomer having been cured from a solvent solution thereof with a nucleophilic curing agent soluble in said solution and in the presence of up to 9 parts by weight of inorganic base per 100 parts of polymer, said inorganic base being effective to at least partially dehydrofluorinate the vinylidenefluoride, and an adhesive layer between the surface of said aluminum base member and said elastomer fusing surface, said adhesive layer having been cured from a solvent solution of a poly(vinylidenefluoride-hexafluoropropylene-tetrafluoroethylene) where the vinylidenefluoride is present in an amount less than 40 mole percent and from about 6 to 20 parts by weight per 100 parts by weight of said poly(vinylidenefluoride hexafluoropropylene-tetrafluoroethylene) of an amino silane represented by the formula:

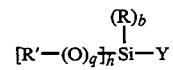

where R can be an alkyl group having 1 to 7 carbon atoms; R' can be an alkyl group having 1 to 7 carbon atoms or a polyalkoxyalkyl group of less than 7 carbon atoms; Y is an amino group or an amino substituted alkyl, or a polyamino substituted alkyl, or an alkenylalkoxy amino, or an aryl amino group of less than 15 carbon atoms, h is 1 to 3, b is 0 to 2, q is 1 or 2 and h+b=3.

2. The fuser member of claim 1 further including at least one base coat elastomer layer between said adhesive layer and said elastomer fusing surface.

3. The fuser member of claim 2 wherein said at least one base coat elastomer layer is poly(vinylidenefluoride-hexafluoropropylene-tetrafluoroethylene) where the vinylidenefluoride is present in an amount less than 40 mole present.

4. The fuser member of claim 3 wherein said adhesive layer is from about 0.4 to 1 mil in thickness, the base coat elastomer layer is from about 4.5 to about 6.5 mils thick and said release layer is from about 1.5 to about 2.5 mils thick.

5. The fuser member of claim 1 wherein said amino silane is gamma-aminopropyl triethoxysilane.

6. The fuser member of claim 1 wherein the nucleophilic curing agent is a fluorinated bisphenol crosslinking agent.

7. The fuser member of claim 2 wherein the nucleophilic curing agent further comprises an organophosphonium salt accelerator.

8. The fuser member of claim 1 wherein said elastomer fusing surface further comprises a metal oxide present in an amount sufficient to interact with the polymeric release agent having functional groups to provide an interfacial barrier layer between said fusing surface and said toner said metal oxide being substantially unreactive with said elastomer.

9. The fuser member of claim 8 wherein the metal oxide is cupric oxide which is present in an amount of from about 5 to 30 parts by weight per 100 parts by weight of polymer.

10. The fuser member of claim 9 wherein the cupric oxide particles have a mean diameter of from about 4 to 8 microns.

11. The method of fusing thermoplastic resin toner images to a substrate comprising forming a film of a polymeric release agent having functional groups on the surface of a heated fuser member, said fuser member comprising an aluminum base member and an elastomer fusing surface comprising poly(vinylidenefluoride-hexafluoropropylene-tetrafluoroethylene) where the vinylidene fluoride is present in an amount less than 40 mole percent, said elastomer having been cured from a solvent solution thereof with a nucleophilic curing agent soluble in said solution and in the presence of up to 9 parts by weight of inorganic base per 100 parts of polymer, said inorganic base being effective to at least partially dehydrofluorinate the vinylidenefluoride; and an adhesive layer between the surface of said aluminum base member and said elastomer fusing surface, said adhesive layer having been cured from a solvent solution of a poly(vinylidenefluoride-hexafluoropropylene-tetrafluoroethylene) where the vinylidenefluoride is present in an amount less than 40 mole percent and from about 6 to 20 parts by weight per 100 parts by weight of said poly(vinylidenefluoride hexafluoropropylene-tetrafluoroethylene) of an amino silane represented by the formula:

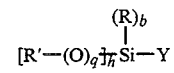

where R can be an alkyl group having 1 to 7 carbon atoms; R' can be an alkyl group having 1 to 7 carbon atoms or a polyalkoxyalkyl group of less than 7 carbon atoms; Y is an amino group or an amino substituted alkyl, or a polyamino substituted alkyl, or an alkenylalkoxy amino, or an aryl amino group of less than 15 carbon atoms, h is 1 to 3, b is 0 to 2, q is 1 or 2 and h+b=3, contacting the toner images on said substrate with the heated elastomer surface for a period of time sufficient to soften the toner, and allowing the toner to cool.

12. The method of claim 11 wherein said fuser member further includes at least one base coat elastomer layer between said adhesive layer and said elastomer fusing surface.

13. The method of claim 12 wherein said at least one base coat elastomer layer is poly(vinylidenefluoride-hexafluoropropylene-tetrafluoroethylene) where the vinylidenefluoride is present in an amount less than 40 mole percent.

14. The method of claim 13 wherein said adhesive layer is from about 0.4 to 1 mil in thickness, the base coat elastomer layer is from about 4.5 to about 6.5 mils thick and said release layer is from about 1.5 to about 2.5 mils thick.

15. The method of claim 11 wherein said amino silane is gamma-aminopropyl triethoxysilane.

16. The method of claim 11 wherein the nucleophilic curing agent is bisphenol crosslinking agent.

17. The method of claim 15 wherein the nucleophilic curing agent further comprises an organophosphonium-salt accelerator.

18. The method of claim 11 wherein said elastomer fusing surface further comprises a metal oxide present in an amount sufficient to interact with the polymeric release agent having functional groups to provide an interfacial barrier layer between said fusing surface and said toner, said metal oxide being substantially unreactive with said elastomer.

19. The method of claim 18 wherein the metal oxide is cupric oxide which is present in an amount of from about 5 to 30 parts by weight per 100 parts of polymer.

20. The method of claim 19 wherein the cupric oxide particles have a mean diameter of from about 4 to 8 microns.

* * * * *